United States Patent
Bennett, III et al.

(10) Patent No.: US 7,912,447 B2
(45) Date of Patent: Mar. 22, 2011

(54) HOME GATEWAY SYSTEM FOR HOME AUTOMATION AND SECURITY

(75) Inventors: Raymond Walden Bennett, III, Naperville, IL (US); Robert Wesley Bossemeyer, Jr., St. Charles, IL (US); Donald Bernard Liebrecht, West Dundee, IL (US); Barry James Sullivan, Long Grove, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 557 days.

(21) Appl. No.: 11/952,830

(22) Filed: Dec. 7, 2007

(65) Prior Publication Data
US 2008/0074258 A1    Mar. 27, 2008

Related U.S. Application Data

(63) Continuation of application No. 09/096,560, filed on Jun. 12, 1998, now Pat. No. 7,349,682.

(51) Int. Cl.
| | |
|---|---|
| G09B 13/00 | (2006.01) |
| H04M 1/64 | (2006.01) |
| H04M 15/06 | (2006.01) |
| G05B 19/42 | (2006.01) |
| G06F 3/14 | (2006.01) |
| G06K 5/00 | (2006.01) |
| A61B 5/00 | (2006.01) |

(52) U.S. Cl. .......... 455/404.1; 455/403; 455/414.1; 455/436; 455/462; 379/88.01; 379/88.02; 370/401

(58) Field of Classification Search .......... 455/401, 455/406, 426.2, 462, 555, 403, 414.1, 436, 455/404.1; 370/352, 356, 401, 469, 541; 379/89.01, 89.02; 340/352, 468
See application file for complete search history.

(56) References Cited

U.S. PATENT DOCUMENTS
| | | | |
|---|---|---|---|
| 4,021,615 | A | 5/1977 | James et al. |
| 4,442,319 | A | 4/1984 | Treidl |
| 4,511,886 | A | 4/1985 | Rodriguez |
| 4,540,851 | A | 9/1985 | Hashimoto |
| 4,653,085 | A | 3/1987 | Chan et al. |

(Continued)

FOREIGN PATENT DOCUMENTS
DE     3529167     2/1987

(Continued)

OTHER PUBLICATIONS

The Yankee Group, "Wireless as Access: AT&T Reaches for the Holy Grail," vol. 14, No. 2 of the Consumer Communications Bulletin issued in Mar. 1997 (5 pages).

(Continued)

*Primary Examiner* — William D Cumming
(74) *Attorney, Agent, or Firm* — Hanley, Flight & Zimmerman, LLC (57) ABSTRACT

A home gateway system for home automation and security is described. An example home gateway system includes a wireless local loop transceiver to establish a wireless local loop point to point link to a geographically separated base station coupled to a public switched telephone network; a home automation controller to communicate with the wireless local loop transceiver; a home security controller, integrated with the home automation controller, to communicate with the wireless local loop transceiver; and a security signal to be monitored by the home security controller, wherein a status of the security signal causes the home gateway system to send a message over the wireless local loop.

20 Claims, 8 Drawing Sheets

U.S. PATENT DOCUMENTS

| | | | |
|---|---|---|---|
| 4,656,655 A | | 4/1987 | Hashimoto |
| 4,658,096 A | * | 4/1987 | West et al. ............... 455/74.1 |
| 4,683,460 A | | 7/1987 | Nakatsugawa |
| 4,885,766 A | | 12/1989 | Yasuoka et al. |
| 5,086,385 A | | 2/1992 | Launey et al. |
| 5,109,407 A | | 4/1992 | Fujita et al. |
| 5,164,982 A | | 11/1992 | Davis |
| 5,268,666 A | | 12/1993 | Michel et al. |
| 5,287,515 A | | 2/1994 | Murai |
| 5,291,479 A | | 3/1994 | Vaziri et al. |
| 5,311,507 A | | 5/1994 | Bedrossian |
| 5,349,633 A | | 9/1994 | Katz |
| 5,369,700 A | | 11/1994 | Koura et al. |
| 5,392,345 A | | 2/1995 | Otto |
| 5,400,246 A | | 3/1995 | Wilson et al. |
| 5,434,395 A | | 7/1995 | Storck et al. |
| 5,461,372 A | * | 10/1995 | Busak et al. ............... 340/5.27 |
| 5,469,496 A | | 11/1995 | Emery et al. |
| 5,475,735 A | | 12/1995 | Williams et al. |
| 5,479,491 A | | 12/1995 | Herrero Garcia et al. |
| 5,506,892 A | | 4/1996 | Kojima et al. |
| 5,526,413 A | | 6/1996 | Cheston, III et al. |
| 5,528,258 A | | 6/1996 | Moon |
| 5,528,285 A | | 6/1996 | Morikawa et al. |
| 5,528,666 A | | 6/1996 | Weigand et al. |
| 5,550,649 A | | 8/1996 | Wong et al. |
| 5,553,223 A | | 9/1996 | Greenlee et al. |
| 5,555,258 A | | 9/1996 | Snelling et al. |
| 5,570,085 A | | 10/1996 | Bertsch |
| 5,572,438 A | | 11/1996 | Ehlers et al. |
| 5,572,572 A | | 11/1996 | Kawan et al. |
| 5,577,118 A | | 11/1996 | Sasaki et al. |
| 5,581,593 A | | 12/1996 | Engelke et al. |
| 5,583,920 A | | 12/1996 | Wheeler, Jr. |
| 5,592,538 A | | 1/1997 | Kosowsky et al. |
| 5,598,456 A | | 1/1997 | Feinberg |
| 5,602,837 A | | 2/1997 | Takahashi |
| 5,603,095 A | | 2/1997 | Uola |
| 5,610,910 A | | 3/1997 | Focsaneanu et al. |
| 5,610,972 A | | 3/1997 | Emery et al. |
| 5,640,444 A | | 6/1997 | O'Sullivan |
| 5,644,629 A | | 7/1997 | Chow |
| 5,664,003 A | | 9/1997 | Foladare et al. |
| 5,742,756 A | | 4/1998 | Dillaway et al. |
| 5,774,357 A | | 6/1998 | Hoffberg et al. |
| 5,917,405 A | | 6/1999 | Joao |
| 5,939,980 A | | 8/1999 | Heitmann et al. |
| 5,971,597 A | | 10/1999 | Baldwin et al. |
| 6,021,324 A | | 2/2000 | Sizer, II et al. |
| 6,032,034 A | * | 2/2000 | Rabina et al. ............... 455/401 |
| 6,058,104 A | | 5/2000 | Snelling et al. |
| 6,097,966 A | * | 8/2000 | Hanley ............... 455/555 |
| 6,141,356 A | | 10/2000 | Gorman |
| 6,188,895 B1 | * | 2/2001 | Schmitz et al. ............ 455/426.2 |
| 6,226,368 B1 | | 5/2001 | Teich et al. |
| 6,343,217 B1 | * | 1/2002 | Borland ............... 455/462 |
| 6,389,292 B2 | * | 5/2002 | Biedermann ............... 455/462 |
| 6,470,179 B1 | * | 10/2002 | Chow et al. ............... 455/406 |
| 6,532,361 B1 | | 3/2003 | Kamperschroer ............ 455/411 |
| 6,542,753 B1 | * | 4/2003 | Swenson ............... 455/462 |
| 6,546,253 B1 | * | 4/2003 | Chow et al. ............... 455/439 |
| 6,556,586 B1 | * | 4/2003 | Sipila ............... 370/469 |
| 6,594,488 B1 | * | 7/2003 | Chow et al. ............... 455/426.1 |
| 6,625,443 B1 | * | 9/2003 | Kamperschroer et al. . 455/414.1 |
| 7,027,566 B2 | * | 4/2006 | Bossemeyer et al. ...... 379/88.02 |
| 7,174,175 B2 | * | 2/2007 | Uang et al. ............... 455/462 |
| 7,349,682 B1 | * | 3/2008 | Bennett et al. ............... 455/403 |
| 7,525,990 B2 | * | 4/2009 | Bossemeyer et al. ......... 370/468 |
| 7,551,071 B2 | | 6/2009 | Bennett et al. |
| 7,596,129 B2 | * | 9/2009 | Bossemeyer et al. ......... 370/352 |
| 7,738,872 B1 | * | 6/2010 | Chow et al. ............... 455/436 |
| 2002/0037004 A1 | * | 3/2002 | Bossemeyer et al. ......... 370/356 |
| 2003/0027565 A1 | * | 2/2003 | Bossemeyer et al. ......... 455/422 |
| 2005/0108091 A1 | | 5/2005 | Sotak et al. |
| 2006/0140356 A1 | * | 6/2006 | Bossemeyer et al. ......... 379/88.1 |
| 2006/0220830 A1 | | 10/2006 | Bennett, III et al. |
| 2007/0127510 A1 | * | 6/2007 | Bossemeyer et al. ......... 370/401 |
| 2008/0074258 A1 | * | 3/2008 | Bennett et al. ............... 340/541 |
| 2009/0201921 A1 | * | 8/2009 | Bossemeyer et al. ......... 370/352 |

FOREIGN PATENT DOCUMENTS

| | | |
|---|---|---|
| JP | 07103493 | 4/1995 |
| WO | 9953654 | 10/1999 |

OTHER PUBLICATIONS

"Computers and Telecomunications—More, Better, Faster, Cheaper," A Bulletin issued on Sep. 13, 1997 (9 pages).

AT&T Learning Network, Blueprint of the Technology Diagrams issued, May 27, 1997 (2 pages).

Lucent Technologies, "Bell Labs Technology, Trends, and Developments," Apr. 1997 (11 pages).

Perry LaForge, "What is in a Name?" Column One Article, Aug. 20, 1997 (3 pages).

The Specifications, claims, abstract, and figures for U.S. Appl. No. 09/061,833, which was filed Apr. 16, 1998, and abandoned on Feb. 24, 2003, for failure to respond to an Office action (47 pages).

Office Action, issued in connection with U.S. Appl. No. 08/999,106, mailed Nov. 16, 1998 (5 pages).

Office Action, issued in connection with U.S. Appl. No. 08/999,106, mailed Jun. 8, 1999 (5 pages).

Office Action, issued in connection with U.S. Appl. No. 08/999,106, mailed Sep. 28, 1999 (5 pages).

Office Action, issued in connection with U.S. Appl. No. 08/999,106, mailed Nov. 8, 1999 (12 pages).

Office Action, issued in connection with U.S. Appl. No. 08/999,106, mailed Jul. 5, 2000 (10 pages).

Office Action, issued in connection with U.S. Appl. No. 08/999,106, mailed Jul. 30, 2003 (10 pages).

Office Action, issued in connection with U.S. Appl. No. 08/999,106, mailed Jan. 12, 2005 (5 pages).

Office action issued by the United States Patent and Trademark Office in connection with U.S. Appl. No. 08/999,106 on Oct. 26, 2000 (3 pages).

Office Action, issued in connection with U.S. Appl. No. 08/999,106, mailed Oct. 4, 2005 (2 pages).

Office Action, issued in connection with U.S. Appl. No. 11/438,265, mailed Sep. 28, 2007 (6 pages).

Office Action, issued in connection with U.S. Appl. No. 11/438,265, mailed Jun. 10, 2008 (5 pages).

Office Action, issued in connection with U.S. Appl. No. 11/438,265, mailed Jan. 14, 2009 (4 pages).

Office Action, issued in connection with U.S. Appl. No. 12/425,273, mailed Sep. 20, 2010 (6 pages).

Reitman, AT&T Announces Fixed Wireless Alternative to Local Service, EDGE Publishing, Mar. 3, 1997, vol. 12 pp. 1-5.

Notice of Allowance issued by the United States Patent and Trademark Office in connection with U.S. Appl. No. 09/096,560 on Dec. 12, 2007 (4 pages).

Office action issued by the United States Patent and Trademark Office in connection with U.S. Appl. No. 09/096,560 on Aug. 15, 2007 (3 pages).

Office action issued by the United States Patent and Trademark Office in connection with U.S. Appl. No. 09/096,560 on Jun. 7, 2007 (17 pages).

Office action issued by the United States Patent and Trademark Office in connection with U.S. Appl. No. 09/096,560 on Dec. 4, 2006 (13 pages).

Office action issued by the United States Patent and Trademark Office in connection with U.S. Appl. No. 09/096,560 on Nov. 30, 2004 (18 pages).

Office action issued by the United States Patent and Trademark Office in connection with U.S. Appl. No. 09/096,560 on Aug. 2, 2001 (12 pages).

Office action issued by the United States Patent and Trademark Office in connection with U.S. Appl. No. 09/096,560 on May 18, 2001 (12 pages).

Office action issued by the United States Patent and Trademark Office in connection with U.S. Appl. No. 09/096,560 on Jan. 10, 2001 (3 pages).

Office action issued by the United States Patent and Trademark Office in connection with U.S. Appl. No. 09/096,560 on Nov. 22, 2000 (10 pages).

Office action issued by the United States Patent and Trademark Office in connection with U.S. Appl. No. 09/096,560 on Jul. 10, 2000 (7 pages).

The specifications, claims, abstract, and figures for U.S. Appl. No. 09/061,833, filed Apr. 16, 1998, and abandoned on Feb. 24, 2003, for failure to respond to an Office action (47 pages).

The Office action issued by the United States Patent and Trademark Office in connection with U.S. Appl. No. 12/425,273 on Jan. 3, 2011 (6 pages).

* cited by examiner

HOME GATEWAY SYSTEM FOR HOME AUTOMATION AND SECURITY

RELATED APPLICATION

This application is a continuation of U.S. patent application Ser. No. 09/096,560, filed on Jun. 12, 1998, entitled "Home Gateway System for Home Automation and Security," which is hereby incorporated by reference.

FIELD OF THE INVENTION

The present invention relates to home automation and security systems and more particularly to a home gateway system for home automation and security.

BACKGROUND

Because of increased security concerns many home owners have a home security system. In addition, many home owners have a variety of machines for receiving information services, such as a cable receiver box, several telephones, an answering machine, a caller ID box, a home Local Area Network (LAN), and a dial up connection to the internet. Unfortunately, only minimal integration has occurred between security systems and these information services. A number of additional features could be provided to a home owner if these services were integrated.

Thus there exists a need for a home gateway system that can integrate the security and home automation features with the information services already found in many homes.

DETAILED DESCRIPTION

The home gateway system for home automation and security has a wireless local loop transceiver. A home automation controller is capable of sending and receiving a message with the wireless local transceiver. A home security controller is capable of sending and receiving a message with the wireless local loop transceiver and the home automation controller. The home gateway system for home automation and security integrates the home automation, home security and with a wireless local loop transceiver. This allows the security system and the automation system to be activated, deactivated and monitored remotely.

Figure 1:
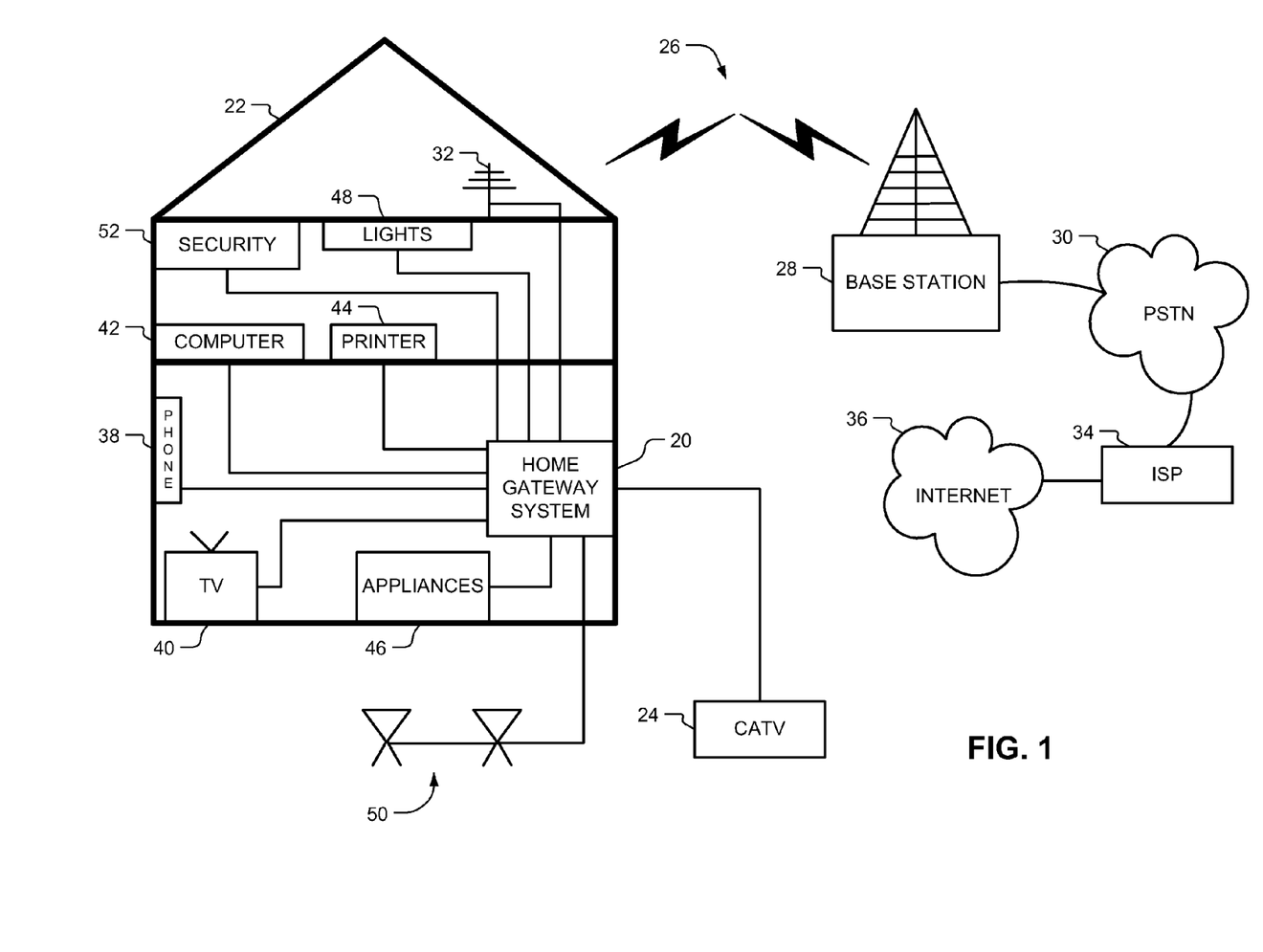
FIG. 1 is a schematic diagram of a home gateway system for home automation and security in accordance with one embodiment of the invention.

FIG. 1 is a schematic diagram of a home gateway system for home automation and security in accordance with one embodiment of the invention. The home gateway system 20 is located inside a house 22. The home gateway system 20 has an input to receive a cable television 24 input signal. The home gateway system 20 is also connected by a wireless local loop 26 and a base station 28, to the public switch telephone network (PSTN) 30. The antenna 32 for the wireless local loop 26 is shown in the attic of the house. The PSTN 30 provides access to an internet service provider (ISP) 34, which provides access to the internet 36. A telephone 38, a television 40, computer 42, printer 44 can all be connected to the home gateway system 20. In addition, appliances 46, lights 48, and sprinkling systems 50 can be connected to the home gateway system as part of the home automation features. A home security system 52 can also be connected to the home gateway system 20. This allows the home automation and security features to be integrated into the home communication system. For instance, the computer 42 can be used to setup times of day for the sprinkling system to turn on or the computer can print a report of the activities of the appliances or the security system.

Figure 2:
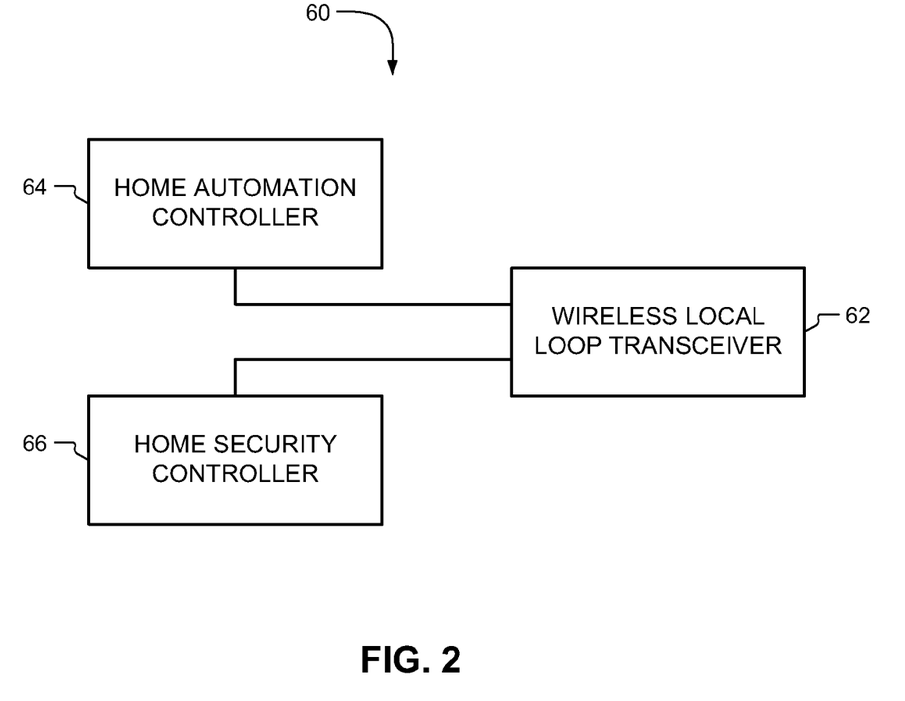
FIG. 2 is a block diagram of a home gateway system for home automation and security in accordance with one embodiment of the invention.

FIG. 2 is a block diagram of a home gateway system 60 for home automation and security in accordance with one embodiment of the invention. The home gateway system 60 has a wireless local loop transceiver 62. A home automation controller 64 is capable of sending and receiving messages from the wireless local loop transceiver 62. A home security controller 66 is capable of sending and receiving messages from the wireless local loop transceiver 62.

Figure 3:
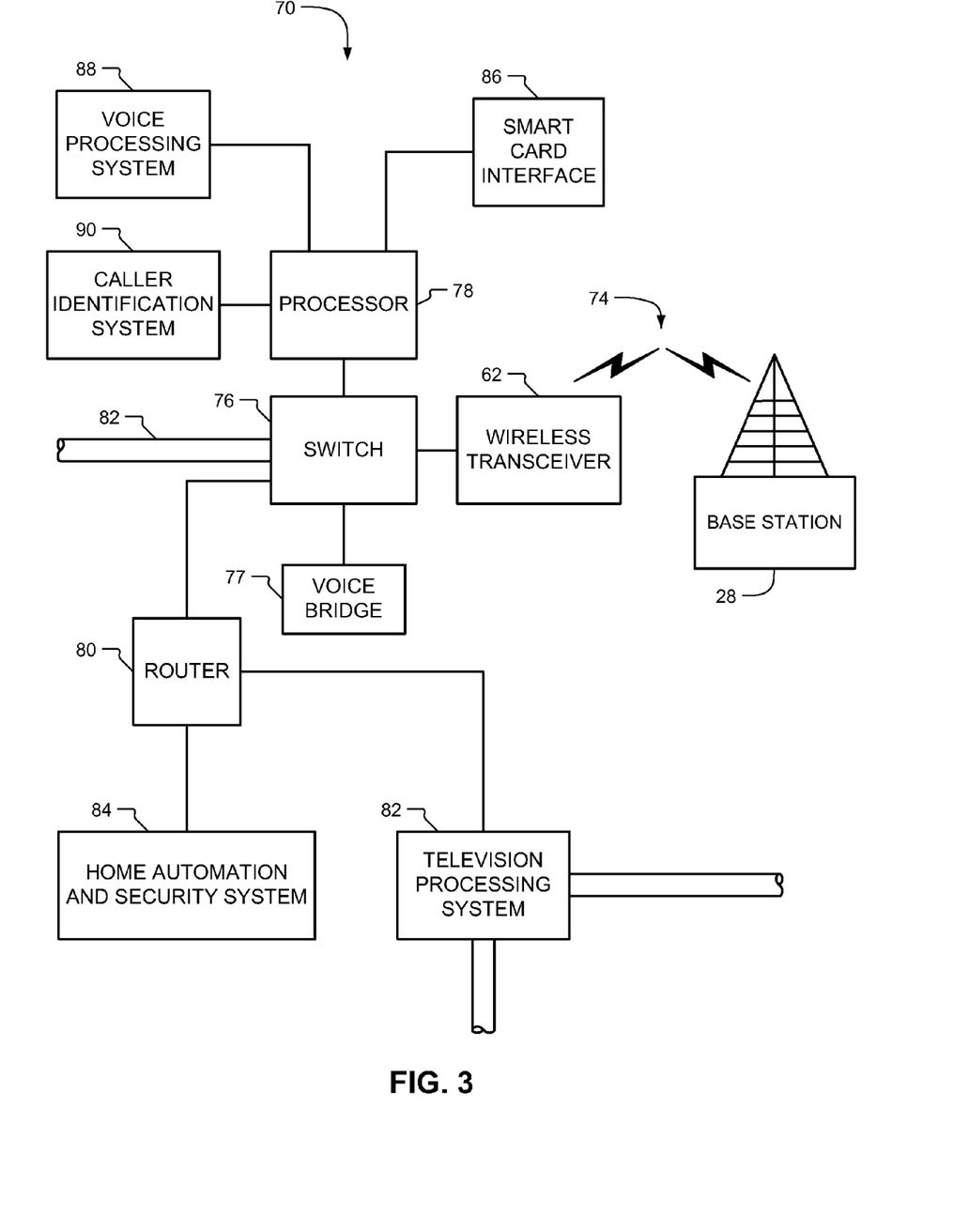
FIG. 3 is a block diagram of a home gateway system for home automation and security in accordance with one embodiment of the invention.

FIG. 3 is a block diagram of a home gateway system 70 for home automation and security in accordance with one embodiment of the invention. In this embodiment, the transceiver 72 establishes a wireless local loop connection 74 with a base station 28. The transceiver 72 is connected to a switch 76. The switch 76 is connected to a voice bridge 77, a processor 78 and a router 80. The switch 76 also has a plurality of input lines 82. Telephones, facsimile machines, and modems are among the devices that can be connected to the switch 76. The router 80 allows a user to establish a local area network within his home. The router 80 in this embodiment is connected to a television processing system 82 and a home automation and security system 84. The processor 78 is connected to a smart card interface 86. The smart card interface is used as a keyless entry and to store certain home automation setups. A voice processing system 88 is connected to the processor 78. The voice processing system 88 includes voice verification and speech recognition capabilities. The voice verification capability is used for remote access to the home automation and security system or is used for keyless entry. A caller identification system 90 is connected to the processor 78. The caller identification system 90 can be used as part of a remote access screening.

Figure 4:
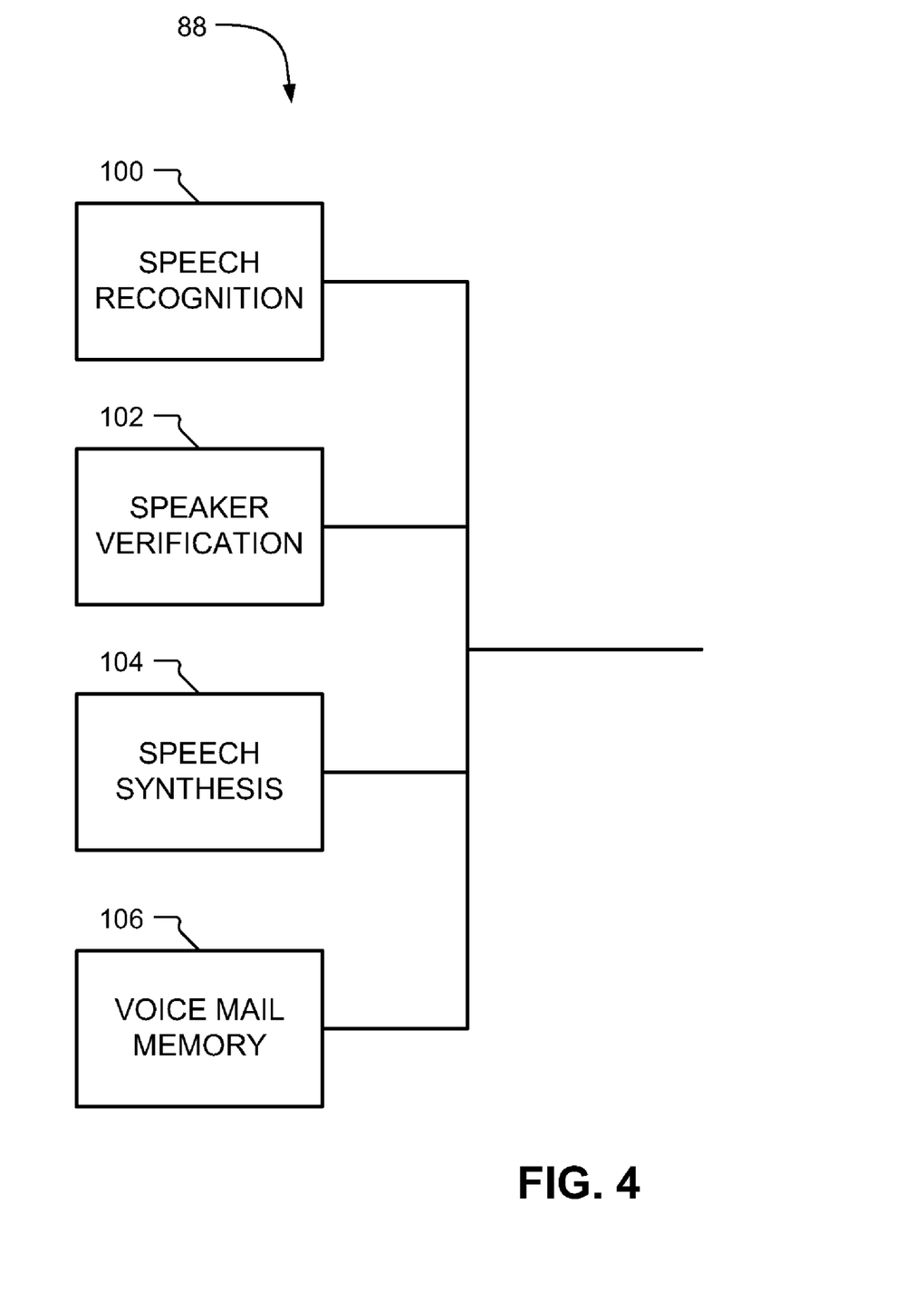
FIG. 4 is a block diagram of a voice processing system in accordance with one embodiment of the invention.

FIG. 4 is a block diagram of a voice processing system 88 in accordance with one embodiment of the invention. The voice processing system contains a speech recognition system 100, a speaker verification system 102, a speech synthesis system 104 and a voice mail memory system 106. The control of the systems of the voice processing system 88 is performed in one embodiment by the processor 78. The processor 78 coordinates the voice system 100-106 to provide machine reception for remote access to the home security system.

Figure 5:
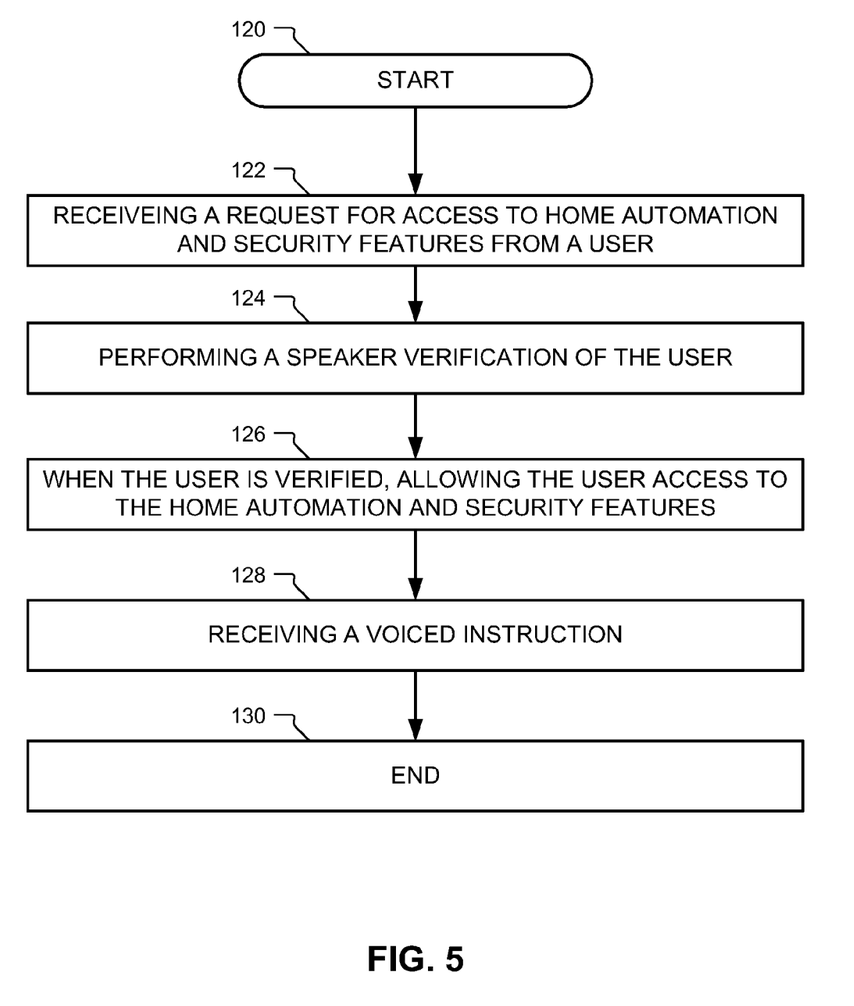
FIG. 5 is a flow chart of the steps used in a home gateway system for home automation and security in accordance with one embodiment of the invention.

FIG. 5 is a flow chart representing of the steps used in a home gateway system for home automation and security in accordance with one embodiment of the invention. The process starts, step 120, by receiving a request for access to home automation and security features from a user at step 122. A speaker verification of the user is performed step 124. When the user is verified, the user is allowed access to the home automation and security features at step 126. At step 128, a voiced instruction is received which ends the process at step 130.

In one embodiment, the step of receiving a request for access to the home automation and security features further includes inputting an electronic address of the home gateway system. Next, an electronic connection is established with the home gateway system. The user is then presented with a plurality of options including the home automation and security features. In one embodiment, the step of entering the electronic address is performed by dialing a phone number. In another embodiment, the electronic connection is a wireless local loop telephony connection.

In yet another embodiment, the electronic connection is an internet connection and the user clicks on the home automation and security features option. The internet connection can be carried over the wireless local loop or over the cable TV link.

In one embodiment, the speaker verification step further includes requesting a user to speak an access code. The access code is recognized using speech recognition. When the access code is valid and belongs to a set of approved access codes, a speaker verification is performed. When the speaker verification fails, the user is requested to enter a personal identification number. When the personal identification is valid, the user is allowed access to the home automation and security features. When the personal identification is not valid the user is denied access to the home automation and security features.

In a further embodiment, the voiced instruction is recognized using the speech recognition system. The recognized instruction is converted into an electronic instruction that the home automation and security system can understand. The electronic instruction is then be sent to the home automation and security controller.

Figure 6:
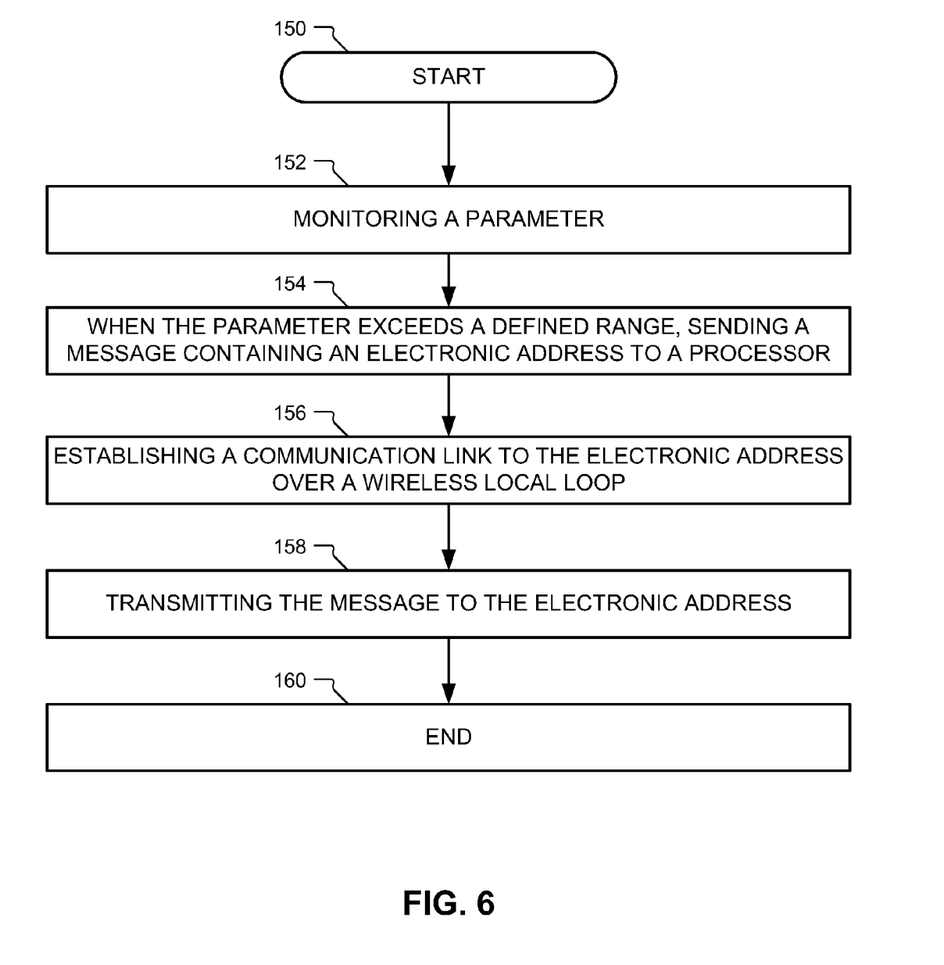
FIG. 6 is a flow chart of the steps used in a home gateway system for home automation and security in accordance with another embodiment of the invention.

FIG. 6 is a flow chart of the steps used in a home gateway system for home automation and security in accordance with another embodiment of the invention. The process starts, step 150, by monitoring a parameter step 152. When the parameter exceeds a defined range, a message is sent containing an electronic address to a processor at step 154. A communication link to the electronic address is established over a wireless local loop at step 156. At step 158 the message is transmitted step 158 to the electronic address, which the process at step 160.

In one embodiment, the parameter is a forceful entry signal and the message contains a police telephone number. In another embodiment, a portion of the message is speech synthesized to form an audio message. The audio message is transmitted to the electronic address. For instance, the audio message could include the street address of house and which sensor which tripped. In addition, the message could tell the police if the owners are home.

In another embodiment, the message includes an internet address of the police. A message is sent to a police computer and includes the street address of house and which sensor was tripped. In yet another embodiment, the parameters monitored can be an appliance. The data points for the parameter can be sent over the internet to the owner at a remote location. This would allow a homeowner to determine if a sprinkler was left on or the furnace had quit working.

Figure 7:
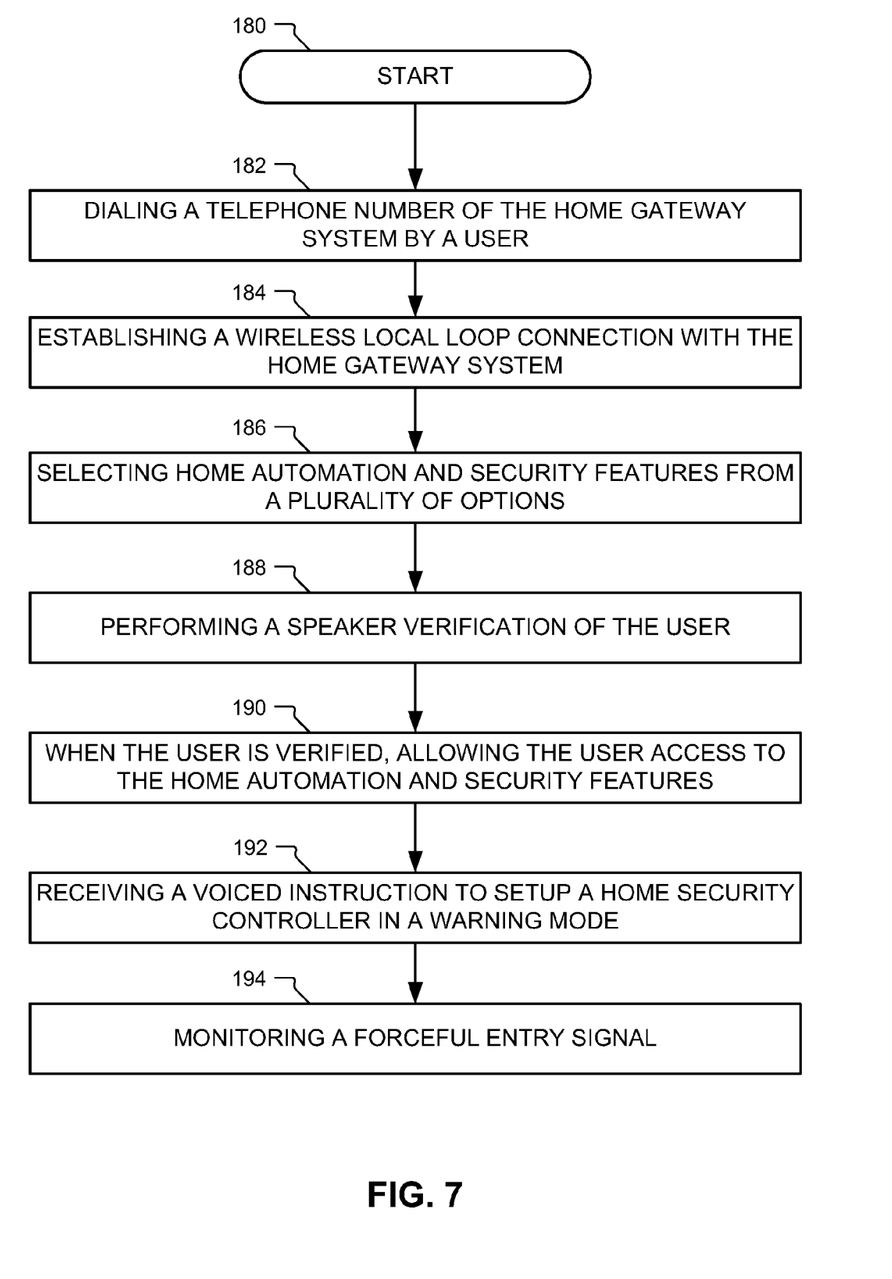
FIGS. 7 and 8 are a flow chart of the steps used in a home gateway system for home automation and security in accordance with another embodiment of the invention.
Figure 8:
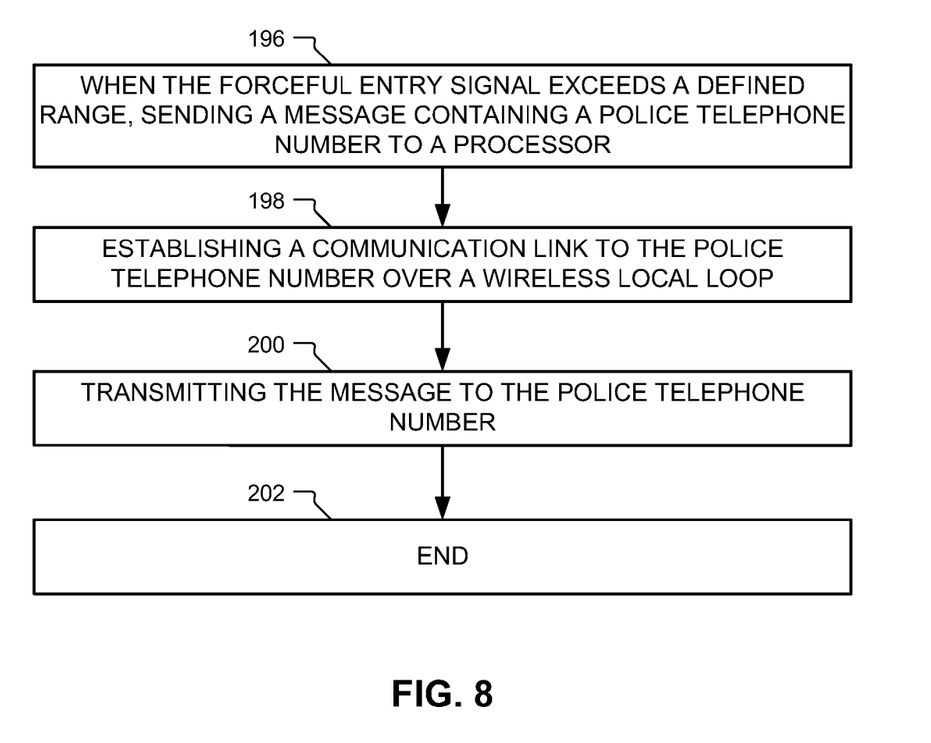

FIGS. 7 and 8 are a flow chart of the steps used in a home gateway system for home automation in accordance with another embodiment of the invention. The process starts, step 180, by the user dialing a telephone number of the home gateway system at step 182. A wireless local loop connection is established with the home gateway at step 184. The user then selects the home automation and security features from a plurality of options at step 186. A speaker verification is performed of the user at step 188. When the user is verified, the user is allowed access to the home automation and security features at step 190. A voice instruction is received from the user to setup the home security controller in a warning mode at step 192. A forceful entry signal is monitored at step 194. When the forceful entry signal exceeds a defined range, a message containing a police telephone number is sent to a processor at step 196. A communication link to the police telephone number is established over wireless local loop at step 198. At step 200, the message is transmitted to the police telephone number, which ends the process at step 202.

Using the invention described herein, the communication functions are integrated with a home automation and security system to allow remote access to the home automation and security system. In addition, the home automation and security system can automatically send messages to the police, fire department, hospital, or to an owner at work.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A home gateway system, comprising:
   a wireless local loop transceiver to establish a wireless local loop point to point link to a geographically separated base station coupled to a network;
   a home automation controller to communicate with the wireless local loop transceiver and to monitor a parameter associated with an appliance implemented at a building associated with the home automation controller, wherein the home automation controller is to cause communication of a first message via the wireless local loop transceiver to an address associated with a person associated with the building when the parameter exceeds an operating range defined to include values of the parameter corresponding to proper operation of the appliance; and
   a home security controller, integrated with the home automation controller, to communicate with the wireless local loop transceiver and to monitor
   a security signal, wherein a status of the security signal causes the wireless local loop transceiver to send a second message to a security entity.

2. A home gateway system as defined in claim 1, further comprising a smart card interface to send a plurality of instructions to the home automation controller.

3. A home gateway system as defined in claim 1, further comprising a voice processing system coupled to a processor.

4. A home gateway system as defined in claim 3, wherein the voice processing system comprises a speaker verification module.

5. A home gateway system as defined in claim 3, wherein the voice processing system comprises a speech recognition module.

6. A home gateway system as defined in claim 1, further comprising a switch to couple the wireless local loop transceiver to the home automation controller and the home security controller.

7. A home gateway system as defined in claim 1, further comprising a plurality of sensors coupled to the home security controller.

8. A method of operating a home gateway system, comprising:
- establishing a wireless local loop point to point link, using a wireless local loop transceiver, to a geographically separated base station coupled to a network;
- placing a home automation controller in communication with the wireless local loop transceiver;
- monitoring a parameter associated with an appliance implemented at a building associated with the home automation controller;
- communicating a first message via the home automation controller via the wireless local loop transceiver to an address associated with a person associated with the building when the parameter exceeds an operating range defined to include values of the parameter corresponding to proper operation of the appliance;
- placing a home security controller, integrated with the home automation controller, in communication with the wireless local loop transceiver; and
- monitoring a security signal using the home security controller, wherein a status of the security signal causes the wireless local loop transceiver to send a second message to a security entity.

9. A method as defined in claim 8, further comprising sending a plurality of instructions to the home automation controller via a smart card interface of the home gateway system.

10. A method as defined in claim 8, further comprising coupling a voice processing system to a processor of the home gateway system.

11. A method as defined in claim 10, wherein the voice processing system comprises a speaker verification module.

12. A method as defined in claim 10, wherein the voice processing system comprises a speech recognition module.

13. A method as defined in claim 8, further comprising coupling the wireless local loop transceiver to the home automation controller and the home security controller via a switch.

14. A method as defined in claim 8, wherein monitoring the security signal comprises using a plurality of sensors coupled to the home security controller.

15. A home gateway system as defined in claim 1, wherein the parameter is a temperature, and wherein the parameter exceeding the operating range indicates that a furnace has ceased operating.

16. A home gateway system as defined in claim 1, wherein the parameter is an amount of time that a sprinkler system has been active, and wherein the parameter exceeding the operating range indicates that the sprinkler system did not cease operating according to a schedule.

17. A method as defined in claim 8, wherein the parameter is a temperature, and wherein the parameter exceeding the operating range indicates that a furnace has ceased operating.

18. A method as defined in claim 8, wherein the parameter is an amount of time that a sprinkler system has been active, and wherein the parameter exceeding the operating range indicates that the sprinkler system did not cease operating according to a schedule.

19. A home gateway system as defined in claim 1, wherein the network comprises a public switched telephone network.

20. A method as defined in claim 8, wherein the network comprises a public switched telephone network.

* * * * *